United States Patent [19]

Campbell

[11] Patent Number: 4,722,632
[45] Date of Patent: Feb. 2, 1988

[54] TENSILELY STRESSED WINDOW USABLE WITH INFRARED DETECTOR

[75] Inventor: Harold L. Campbell, Maitland, Fla.

[73] Assignee: Oerlikron-Buehrle AG, Zurich, Switzerland

[21] Appl. No.: 918,407

[22] Filed: Oct. 14, 1986

Related U.S. Application Data

[62] Division of Ser. No. 612,195, May 21, 1984, Pat. No. 4,647,244.

[51] Int. Cl.⁴ .............................................. F16B 11/00
[52] U.S. Cl. ..................................... 403/179; 403/272; 403/404; 228/124; 228/122; 65/59.4; 65/60.4
[58] Field of Search ................... 403/404, 179, 28, 29, 403/30, 265, 270, 271, 272; 445/44; 228/121, 124, 122; 65/59.37, 59.4, 59.24, 59.27, 59.34, 59.3, 60.4, 60.2

[56] References Cited

U.S. PATENT DOCUMENTS

| | | | |
|---|---|---|---|
| 2,534,392 | 12/1950 | Walsh | 65/59.3 X |
| 2,584,653 | 2/1952 | Alpert | 403/30 |
| 2,722,496 | 11/1955 | Hosmer | 228/124 |
| 2,744,592 | 5/1956 | Remond | 403/28 |
| 2,820,534 | 1/1958 | Hume | 228/122 X |
| 2,996,401 | 8/1961 | Welch et al. | 228/122 X |
| 3,061,664 | 10/1962 | Kegg | 445/44 X |
| 3,065,533 | 11/1962 | Dungan et al. | 228/121 |
| 3,173,201 | 3/1965 | Mofson | 228/124 |
| 3,253,331 | 5/1966 | Limansky | 228/124 |
| 3,275,358 | 9/1966 | Shonebarger | 403/179 |
| 3,302,961 | 2/1967 | Franklin | 228/124 X |
| 3,414,964 | 12/1968 | Emeis et al. | 228/122 |
| 3,415,556 | 12/1968 | Dryden | 228/122 X |
| 3,481,638 | 12/1969 | Dryden | 228/122 |
| 4,428,764 | 1/1984 | Snitzer et al. | 65/60.2 X |
| 4,647,244 | 3/1987 | Campbell | 403/179 |

FOREIGN PATENT DOCUMENTS 997358  6/1952  France .............................. 403/179

Primary Examiner—Andrew V. Kundrat
Assistant Examiner—Joseph A. Fischetti
Attorney, Agent, or Firm—Julian C. Renfro

[57] ABSTRACT

A method of securing a window of crumbly material in the end of a tube so as to effectively prevent leakage during temperature cycling, first involving the step of selecting a window having a small clearance when placed inside the end of the tube. Any contamination is removed from the periphery of the window, and then a thin metallic layer that will accept nickel plate is vapor deposited around the periphery of the window. Subsequently, a hoop of tensilely stressed nickel plate is applied over the thin metallic layer, after which the window and tube are sweated together by the application of suitable amounts of solder and heat. Significantly, the hoop of nickel serves to keep the window in continuous compression, such that leakage between the window and tube is effectively prevented.

9 Claims, 3 Drawing Figures

TENSILELY STRESSED WINDOW USABLE WITH INFRARED DETECTOR

This is a division of application Ser. No. 612,195 filed May 21, 1984 now U.S. Pat. No. 4,647,244.

BACKGROUND OF THE INVENTION

In the past, a number of patents have been granted upon processes in accordance with which suitable seals have been created between two materials that are difficult to join. The Hume U.S. Pat. No. 2,820,534 is one such teaching, and it describes how a hermetically sealed ceramic-metal structure can be created. Although such a teaching makes it possible to bond aluminum or magnesium to a ceramic, it does not represent a teaching that could sustain wide temperature variations, nor does it otherwise represent a suitable teaching for certain ceramic-metal joinders.

The Emeis U.S. Pat. No. 3,414,964 addresses the problem of producing a solder joint between metals and ceramic, involving the use of silver foil, but this process likewise falls short of providing a method that, when practiced in connection with certain non-metallic materials, enables the joint to withstand severe temperature cycling.

Likewise, the Smith U.S. Pat. No. 3,616,523 represents a method of sealing an electrically non-conductive optical window to an electrically non-conductive envelope of an electron discharge device, involving the use of an electrically conductive sealant, to which is applied heat and a high unidirectional voltage so as to effect a curing thereof. Again, however, that teaching would not permit wide temperature swings without leakage tending to occur.

It was in an effort to improve upon prior art teachings of this type that the present invention was evolved.

SUMMARY OF THIS INVENTION

Certain infrared detectors have a need to be maintained in a carefully regulated environment, such as being hermetically sealed in a metal tube in which a hard vacuum can be held. A window transparent to the desired frequency must be mounted in the end of the tube, and zinc selenide is widely used as window material for a number of reasons, including its ability to withstand high temperatures.

In the past, the zinc selenide was thin filmed with chrome, copper and gold and then soldered into a stainless steel tube, thus to form a window ideal for use with an infrared detector. Unfortunately, however, the joint between window and tube was often found to be unable to survive temperature cycling between −40° C. and ±105° C. without losing hermeticity. Failure analysis determined that the leakage path was between the zinc selenide and the vapor deposited metals. Unfortunately, zinc selenide is a ceramic material with a low tensile strength, that tends to be crumbly.

One attempted solution to the problem of lack of adhesion of the vapor deposited metals to the zinc selenide involved the proposed reinforcement of the bond, and the thickening of the soft solder joints to give a more pliable material. Although increasing the thickness of the solder joint seemed to represent an improvement, a reliable joint nevertheless could not be accomplished, particularly when such a joint had to withstand an extensive amount of temperature cycling.

Finally after much investigation, I have found a truly satisfactory solution, involving the utilization of vapor deposited metal around the periphery of the window, followed by the application of a hoop stressed in tension around the vapor deposited metal, so that the metalization to the zinc selenide sees only compression throughout temperature cycling. As will be seen hereinafter, I prefer to employ an application of tensilly stressed nickel plate in order to create the hoop around the vapor deposited metal, with the result being that a highly successful joint is created.

It is therefore a primary object of this invention to provide an effective seal between a ceramic material having a low tensile strength, and the end of a tube in which the ceramic material is to be mounted, such that evacuation of the tube and an extensive amount of temperature cycling can take place without seal failure.

It is another object of my invention to utilize a highly satisfactory technique for installing a zinc selenide window in the end of a tube, when vapor deposited metals have been applied around the periphery of the window, the improvement involving the application of tensilly stressed nickel plate over the vapor deposited metals so as to place the zinc selenide window in continuous compression, and thus make such window able to withstand an extensive amount of thermal cycling without the occurrence of leakage between the window and the tube.

It is yet another object of my invention to provide a novel method for securing a window of crumbly material in the end of a tube, accomplished in such a manner that leakage will not occur, despite an extensive amount of temperature cycling.

These and other objects, features and advantages will be more apparent from a study of the other portions of this application.

DETAILED DESCRIPTION OF THE PREFERRED EMBODIMENT

Figure 1:
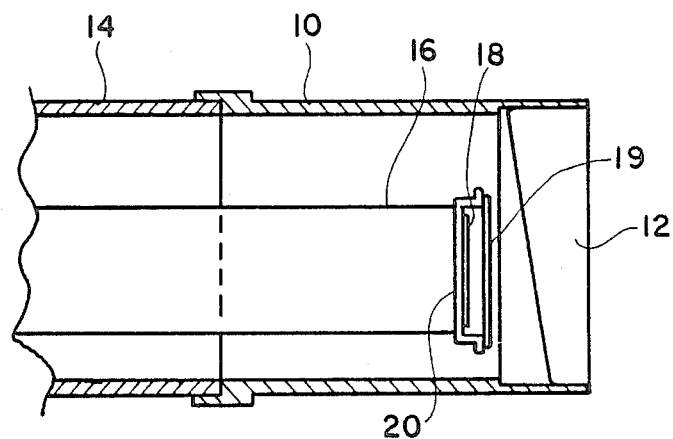
FIG. 1 is a cross-sectional view, to scale of approximately 2½ to 1, taken along approximately the centerline of a tube, in the end of which tube, a window has been installed in a leakproof manner in accordance with the instant invention.

Referring to FIG. 1, it will be seen that I have there illustrated a portion of a tube 10, in the end of which is a window 12 of generally circular configuration and of crumbly material, secured in such a manner as to enable a hard vacuum to be maintained inside the tube 10. The crumbly material may be ceramic, and more particularly, zinc selenide, and the procedure by which the window 12 is secured in the end of the tube in a leaktight manner will be discussed at length hereinafter.

The tube portion 10 is attached in a sealed manner to a longer tube portion 14 of the same diameter, and these tube portions may for example by of 300 series stainless steel tubing plated with 50-100 micro inches of allsulphmate nickel per MIL-P-27418. This is followed by 0.0007-0.0010 inches of 99.99% pure gold plate per MIL-G-45204, type III. The parts are then vacuum baked at 670°+10° C. for 15+3 minutes. These latter details do not closely affect the invention, and are presented only by way of example. Obviously, I am not to be limited thereto.

The end of tube 10 may be recessed for a depth of approximately ¼" in order to form a slight shoulder against which the zinc selenide window 12 is received. The window 12 may for example be ½ inch in diameter, and ¼ inch thick, and fits inside the end of the tube with a very small amount of clearance. As made clear in FIG. 1, this window is somewhat wedge-shaped when viewed in cross section. Extending along the interior of the tubes 10 and 14 for most of their length is a tube 16 of somewhat smaller diameter, in which means are provided for cooling to a low temperature, the detector 18 that is mounted on the cold tip 20 and protected by a cold filter 19. The particular detector used forms no part of this invention.

Figure 2:
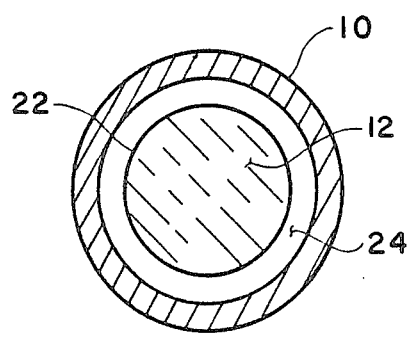
FIG. 2 is a view not to scale of a window in the end of the tube, installed in accordance with the teachings of the prior art.

Turning to FIG. 2, it will be seen that in accordance with prior art techniques, the zinc selenide window 12 is mounted in the end of the tube. However, before being mounted in the tube, to the periphery are applied thin film layers 22 of chrome, copper and gold. Then, it has been customary to secure the window in place by soft solder 24. However, it was found that when the elaborately prepared window was mounted in the tube end by the employment of these customary procedures, hermeticity was lost when temperature cycling tests were conducted between −40° C. and +105° C.

Failure analysis determined that the leakage path was between the zinc selenide and the vapor deposited metals. As is known, zinc selenide is a ceramic material with low tensile strength. Making the solder joint thicker 24 was responsible for a noticeable improvement, but a fully reliable joint still could not be accomplished, believed to be at least partly due to the zinc selenide and the stainless steel tube having widely differing thermal coefficients of expansion.

Figure 3:
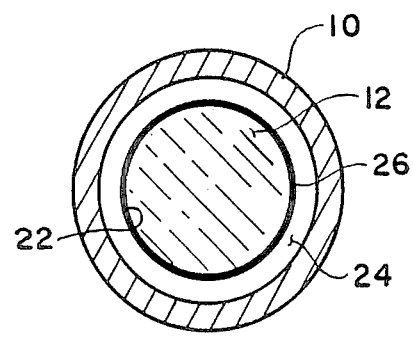
FIG. 3 is a view similar to FIG. 2, but here showing the window installed in accordance with my advantageous new technique.

Turning now to FIG. 3, it will be seen that in accordance with this invention, I have electro plated a tensilly stressed hoop 26 of nickel plate around the metallized periphery of the zinc selenide window 12, such that the window sees only compression during temperture cycling. Thereafter solder, preferably soft solder, is used to secure the window into the end of the tube. As a result, my joint is sufficiently effective as to enable a hard vacuum to be maintained inside the tubes 10 and 14, even during very extensive temperature cycling tests.

More specifically, a preferred method of carrying out my invention is as follows:
1. Establish clearance between the periphery of the window and the interior of the tube, of approximately 0.00125 to 0.0075 inches after the periphery of the window has been plated.
2. Remove zinc sulfide anti-reflection coating from periphery by light abrasion.
3. Vapor deposit chrome-copper-gold or tungsten-copper-gold around the periphery of the zinc selenide window.
4. Apply a hoop of tensily stressed nickel plate over the thin film metallization.
5. Protect the activated nickel plate with a flash plating of gold.
6. Pretin both the zind selenide window and sintered plated (nickel-gold) tube and sweat together.

In the typical instance, chrome first is vapor deposited around the periphery of the zinc selenide window, to which it adheres well. This is followed by a deposit of copper on the chrome, with gold being deposited upon the copper in order to protect it from oxidation. These metals can be deposited successively during a single procedure carried out in a vacuum chamber.

As to the application of nickel plate over the thin film metallization, although it is ordinarily desirable to utilize a plating bath that is free of contaminates, thus to avoid the creation of stresses in the plated material, in this instance I prefer for trace metals, such as of copper, zinc or chrome to remain in the bath, thus to deliberately bring about the creation of nickel plating subject to a substantial amount of tensile stress.

A stressometer is a mechanical measuring device readily available on the market, and this device functions as a plating procedure is underway, to advise as to the extent of stresses that may be present during the deposition of nickel upon a component. Although stresses substantially greater than 1,100 pounds per square inch would not be harmful to my window, I typically try to achieve minimum stresses of approximately 1,000 psi to 1,100 psi in order that a suitable amount of compressive stress is present, thus to keep the zind selenide window from developing a leakage path at such time as it has been soldered into the end of the stainless steel tube. The thickness of the stressed nickel layer can be on the order of 0.001 inches.

After removal of the window from the nickel plating bath, the periphery of the window is pre-tinned, and the end of the tube 10 for receiving the window is likewise pre-tinned. Then, upon the window being sweated into the proper position in the end of the tube, leakage paths are effectively prevented, and a hard vacuum can be effectively maintained in the tube 10.

Whereas a yield of only 10% was possible in accordance with previous methods, by the utilization of my novel method, yields of 90% to 95% are regularly maintained. As should be obvious, I am not to be limited to any one type of metallization around the window, and for example, it may be preferable to deposit tungsten-copper-gold around its periphery, instead of chrome-copper-gold.

I claim:

1. A window of crumbly ceramic material unable to withstand elevated temperatures, that resides in a recess in one end of a metal tube so tightly that no leakage occurs in the joint between window and tube, comprising a circular window slightly smaller in diameter than the inner diameter in such recession the tube, said window being of substantial thickness, and having a thin deposit of metal around its entire periphery, around which deposit is a hoop of tensilely stressed nickel, said window, when carefully soldered to the inner periphery of such recess in the end of the tube, effectively resisting joint leakage, even during severe temperature cycling.

2. The window as recited in claim 1 in which said ceramic material is of zinc selenide.

3. The window as recited in claim 1 in which said hoop of tensilly stressed nickel is approximately 0.001 inches thick.

4. The window as recited in claim 1 in which said hoop of nickel has a minimum tensile stress of approximately 1000 pounds per square inch.

5. A window assembly comprising a circular window of crumbly ceramic material unable to withstand elevated temperatures, which window is mounted in an end of a circular mounting tube so tightly that no leakage can occur in the joint between window and tube, one end of said tube having a slight circular recess created to form a slight shoulder on the interior portion adjacent said one end of said tube, into which circular recess said circular window is received, said circular window being slightly smaller in diameter than the recess in which it is received, said window having sufficient thickness that a peripheral surface capable of being sealed to the inner periphery of such recess is defined, said peripheral surface of said window having a thin deposit of metal extending completely therearound, upon which deposit of metal is a hoop of tensilely stressed nickel, said window, when carefully soldered in said recess in said tube end, effectively resisting joint leakage, even during severe temperature cycling.

6. The window as defined in claim 5 in which said ceramic material is zinc selenide.

7. The window as recited in claim 5 in which said hoop of tensilely stressed nickel is approximately 0.001 inches thick.

8. The window as recited in claim 5 in which said hoop of nickel has a minimum tensile stress of approximately 1000 pounds per square inch.

9. The window as recited in claim 5 in which said window is wedge-shaped in cross section.

* * * * *